US 007646781B2

(12) United States Patent
Campion et al.

(10) Patent No.: US 7,646,781 B2
(45) Date of Patent: Jan. 12, 2010

(54) METHODS, SYSTEMS, AND COMPUTER PROGRAM PRODUCTS FOR SELECTIVELY DISCARDING PACKETS

(75) Inventors: Nicholas F. Campion, Rochester, MN (US); Keith D. Cramer, Pine Island, MN (US); Donald A. Morrison, Rochester, MN (US); Daniel J. Strauss, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 11/753,703

(22) Filed: May 25, 2007

(65) Prior Publication Data

US 2008/0291935 A1 Nov. 27, 2008

(51) Int. Cl.
*H04L 12/56* (2006.01)
(52) U.S. Cl. ....................... 370/412; 370/235
(58) Field of Classification Search ............. 370/234, 370/229, 230, 232, 235, 235.1, 352, 412, 370/428, 429, 395.21, 395.4, 395.41, 395.42, 370/395.52, 470
See application file for complete search history.

(56) References Cited

U.S. PATENT DOCUMENTS

| | | | |
|---|---|---|---|
| 2006/0072576 A1* | 4/2006 | Miao et al. | 370/394 |
| 2006/0291384 A1* | 12/2006 | Harris et al. | 370/229 |
| 2007/0201365 A1* | 8/2007 | Skoog et al. | 370/230.1 |
| 2009/0129313 A1* | 5/2009 | Tamura et al. | 370/328 |

OTHER PUBLICATIONS

Web page published by "vonage.nmhoy.net/qos.html"; http://web.archive.org/web/20060314042029/http://vonage.nmhoy.net/qos.html; retrieved on May 8, 2007, pp. 1-5.

* cited by examiner

*Primary Examiner*—Brian D Nguyen
(74) *Attorney, Agent, or Firm*—Cantor Colburn, LLP

(57) ABSTRACT

A method, system, and computer program product are provided for selectively discarding packets in a network device. The method includes receiving an upstream bandwidth saturation indicator for a queue in the network device, and identifying one or more codecs employed in packets in the queue when the upstream bandwidth saturation indicator indicates saturation. The method further includes determining a packet discarding policy based on the one or more codecs, and discarding packets in accordance with the packet discarding policy.

23 Claims, 5 Drawing Sheets

DISCARDING POLICY TABLE
130

| 302 CODEC | 304 FRAME SIZE (ms) | 306 BIT RATE (kb/s) | 308 DISCARDING SCHEDULE | 310 CODEC PRIORITY |
|---|---|---|---|---|
| G.722.1 | 20 | 24/32 | 1 of 4 | M |
| G.723.1 | 30 | 5.6/6.3 | 1 of 3 | H |
| G.728 | 2.5 | 16 | 4 of 12 | L |
| G.729 | 10 | 8 | 1 of 3 | L |
| GSM 06.10 | 22.5 | 13 | 1 of 4 | M |
| LPC10 | 22.5 | 2.4 | 1 of 4 | M |
| iLBC | 30 | 8 | 1 of 5 | H |
| ⋮ | ⋮ | ⋮ | ⋮ | ⋮ |
| DoD CELP | 30 | 4.8 | 1 of 10 | H |

FIG. 3

METHODS, SYSTEMS, AND COMPUTER PROGRAM PRODUCTS FOR SELECTIVELY DISCARDING PACKETS

BACKGROUND OF THE INVENTION

The present disclosure relates generally to communication networks, and, in particular, to methods, systems, and computer program products for selectively discarding packets.

In many streaming-content applications through a network, such as streaming audio and/or video, the most important aspect of performance is real-time delivery. Timely delivery of streaming content is particularly vital in interactive communications, e.g., voice over Internet protocol (VoIP). Attempting to support streaming content often leads to congested, unresponsive networks, particularly when a large volume of network traffic is present. In heavy use networks, such as converged data and streaming-content networks, greater congestion typically results in greater latency. As latency increases, data packets can be discarded and streaming content can appear choppy as the streaming content is delayed.

One approach to handling mixed priority network traffic, such as streaming content (real time) and bulk data movement (non-real time), is through Quality of Service (QoS) guarantees. A network device, such as a router or switch, supporting QoS typically employs seven levels of priority and a bulk level of priority, queuing up traffic into different queues based on priority. As packets of network traffic arrive, the packets are prioritized and placed in corresponding priority queues. Time-sensitive data packets, such as streaming content, are typically placed into one or more higher priority queues, while general data and file transfer packets are placed into one or more lower priority queues. The queues are serviced in descending priority based on the available upstream bandwidth. The highest priority packets are placed into the upstream first, followed by packets from successively lower priority queues until all of the upstream bandwidth is utilized. However, during periods of heavy network traffic, there may be more high priority (e.g., VoIP) packets queued than can be transmitted, resulting in a saturated condition.

When a saturated condition impedes servicing a queue in a network device, which holds streaming-content packets, the network device may randomly discard packets even though they are of high priority (e.g., contain real-time content). This may result in very unpredictable call quality for VoIP, as some calls can lose several packets, while other calls lose none. Moreover, each packet may include differing amounts of content, resulting in more substantial losses for some callers, e.g., a loss of audio for a 30-millisecond duration packet is more problematic than the loss of a 10-millisecond duration packet. One example of when a saturation condition could occur is during an emergency situation, where many people attempt to use their VoIP phones at approximately the same time. The resulting unpredictable packet losses from the saturation condition can cause many VoIP calls to be dropped due to delays and interrupted service.

Another option to mitigate a saturation condition is to lower the priority of some of the higher priority traffic, through shifting higher priority packets into a lower priority queue, allowing the remaining higher priority traffic to use the available upstream bandwidth. Shifting packets to a lower priority queue may work well in a situation where the demand on higher priority queues is relatively consistent, but in an emergency situation, with a large volume of VoIP callers flooding the highest priority queue, random failures and a large drop in perceived call quality may result. Additionally, lowering the priority of some higher priority packets in a random fashion can produce the same effective result as randomly discarding packets, as lower priority queues may be infrequently serviced while the network device is saturated.

Accordingly, there is a need in the art for a method to selectively discard packets in a network device during a saturation condition so as to minimize the net effect on streaming content.

BRIEF SUMMARY OF THE INVENTION

Embodiments of the invention include a method for selectively discarding packets in a network device. The method includes receiving an upstream bandwidth saturation indicator for a queue in the network device, and identifying one or more codecs employed in packets in the queue when the upstream bandwidth saturation indicator indicates saturation. The method further includes determining a packet discarding policy based on the one or more codecs, and discarding packets in accordance with the packet discarding policy.

Additional embodiments include a method for selectively discarding packets in a network device. The method includes receiving packets employing one or more codecs in a queue in the network device, and setting an upstream bandwidth saturation indicator for the queue when bandwidth demand of the packets in the queue exceeds available upstream bandwidth. The method further includes identifying the one or more codecs employed in the packets in the queue when the upstream bandwidth saturation indicator indicates saturation, and determining a packet discarding policy based on the one or more codecs via cross-referencing the one or more codecs to a codec policy table. The codec policy table includes a list of codecs and an associated frame size. The method also includes discarding packets in accordance with the packet discarding policy.

Further embodiments include a system for selectively discarding packets. The system includes a network device in communication with at least one end-user client device. The network device includes a queue, which receives packets employing one or more codecs. The packets are from the at least one end-user client device. The network device includes a packet discarding agent that receives an upstream bandwidth saturation indicator for the queue, and identifies the one or more codecs employed in the packets in the queue when the upstream bandwidth saturation indicator indicates saturation. The packet discarding agent also determines a packet discarding policy based on the one or more codecs, and discards packets in accordance with the packet discarding policy.

Additional embodiments include a computer program product for selectively discarding packets in a network device. The computer program product includes a storage medium readable by a processing circuit and storing instructions for execution by the processing circuit for implementing a method. The method includes receiving an upstream bandwidth saturation indicator for a queue in the network device, and identifying one or more codecs employed in packets in the queue when the upstream bandwidth saturation indicator indicates saturation. The method further includes determining a packet discarding policy based on the one or more codecs, and discarding packets in accordance with the packet discarding policy.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts an exemplary discarding policy table that may be utilized by exemplary embodiments;

Figure 1:
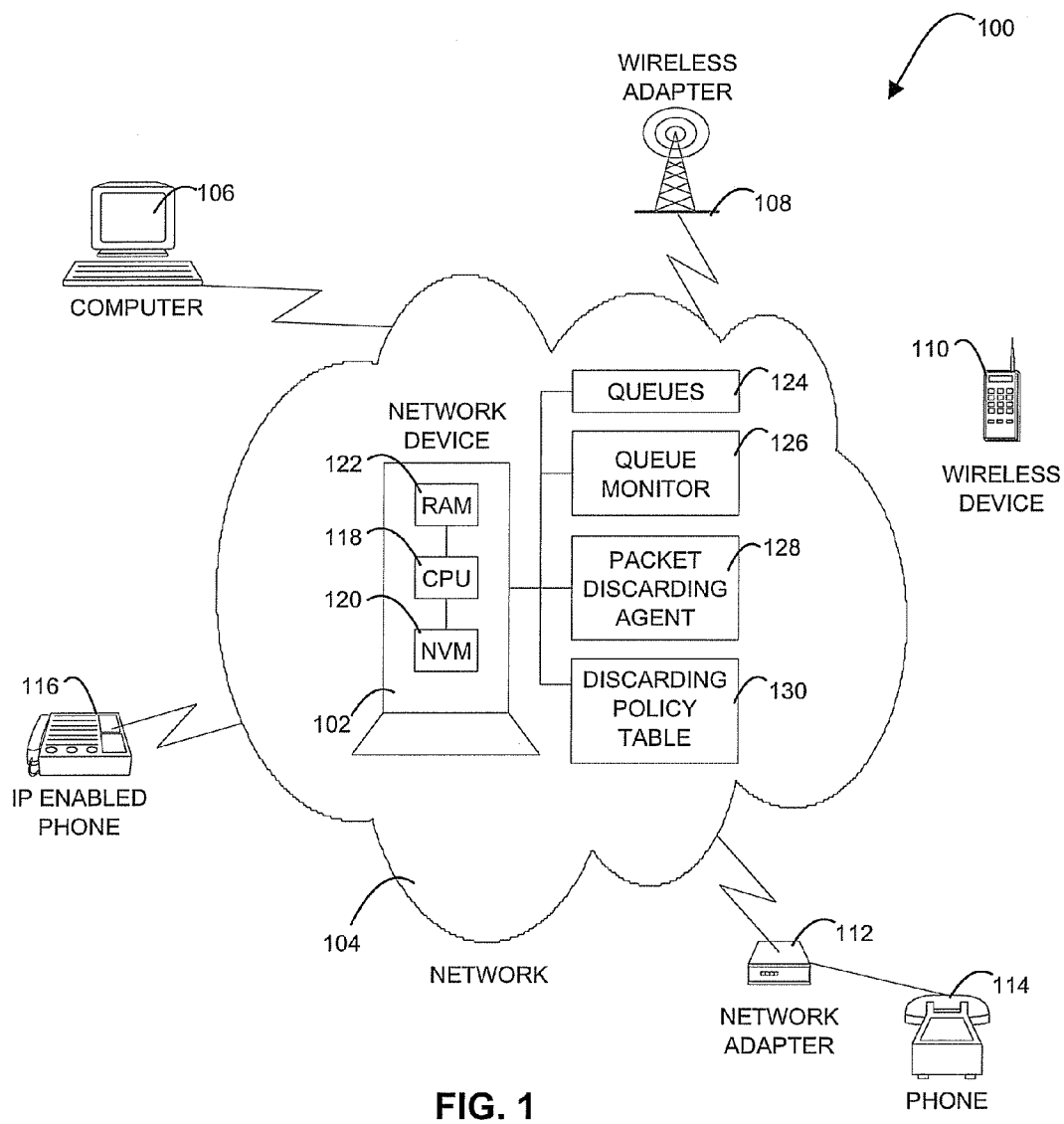
FIG. 1 depicts an exemplary system for selectively discarding packets that may be utilized by exemplary embodiments.

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods, systems and computer program products for selectively discarding packets in a network device. In exemplary embodiments, end-user client devices communicate through a network of network devices. When the end-user client devices communicate using streaming content, such as voice over Internet protocol (VoIP) or video conferencing, the demand placed on network devices can be substantial, resulting in increased network device congestion (e.g., high demand of available bandwidth). While the use of codecs assists in compressing content to reduce bandwidth requirements for audio and/or video communications, low latency of packets employing various codecs remains critical to maintaining the integrity of real-time streaming-content delivery.

A differentiated service utilizing priority queues may enable delivery of high quality real-time streaming content across a heavily congested network. Using the differentiated service, packets can be prioritized based on payload type. For example, since VoIP is time sensitive, VoIP packets may be assigned to a high priority queue. Conversely, large file transfers, such as those employing file transfer protocol (FTP), may be assigned to a low priority queue. When a network device employs a differentiated service, the queues within the network device are serviced in order of priority. Thus, while a large file transfer may initially consume the majority of the network device bandwidth, a higher priority VoIP phone call can preempt the file transfer, preserving phone call quality, while slowing the file transfer.

A saturation condition may occur when all of the upstream bandwidth (for transferring packets out of the network device) is utilized by a high priority queue, which may occur, for example, when a large number of VoIP callers attempt to make phone calls at approximately the same time through the network device. In exemplary embodiments, when the saturation condition occurs, a packet discarding agent determines which packets to discard such that the remaining high priority packets can be transmitted from the network device. The packet discarding agent selects packets for discarding based on the particular codecs employed by packets within the queue. The packet discarding agent may determine a packet discarding policy through mapping the codecs to a discarding policy table that defines the relative priority of each codec.

Packets employing an assortment of codecs can have substantial differences in various properties, such as frame size, sampling rate, bit rate, and the like. For example, G.729 delivers 10 milliseconds of audio in each packet, while iLBC delivers 30 milliseconds of audio per packet. To minimize choppy performance in streaming-content, and to lower the risk of a lost connection due to an inactivity timeout, the time gap resulting from a discarded packet is an important consideration when determining which packets should be discarded. In exemplary embodiments, the frame size property for a codec indicates the duration of time captured within each packet, and not necessarily the number of bytes in a given packet or frame. While the number of bytes in a given packet or frame of data may remain approximately constant between codecs, the frame size property can vary based on codec specific compression rates of the audio and/or video data. Variations in codec compression rates can enable a 10-millisecond audio frame or a 30-millisecond audio frame to fit within approximately the same number of bytes, although with differing levels of quality. By prioritizing which packets should be discarded based on the frame size, the impact of the loss can be mitigated such that packets containing a smaller frame size codec are discarded before packets containing a larger frame size codec. For example, a VoIP call using G.729 would only suffer a 10-millisecond loss of audio when a G.729 packet is discarded, but a VoIP call using iLBC would lose 30 milliseconds of audio when an iLBC packet is discarded. Other codec properties, such as bit rate, may also be useful in establishing a priority of discarding packets. It will be understood by those skilled in the art that any number or combination of codec properties can be used to establish a codec discarding policy, schedule, and/or priority, including user selectable preferences. Further details regarding selectively discarding packets are provided herein.

Turning now to the drawings, it will be seen that in FIG. 1 there is a block diagram of a system 100 for providing network congestion relief that is implemented in accordance with exemplary embodiments. The system 100 of FIG. 1 includes a network device 102 in communication with end-user client devices over a network 104. A variety of end-user client devices may communicate through the network 104, such as a computer 106, a wireless adapter 108 in communication with a wireless device 110, a network adapter 112 in communication with a phone 114, and an Internet protocol (IP) enabled phone 116. It will be understood that any number of end-user client devices can communicate through the network 104, including other devices known in the art, which are not depicted in FIG. 1, e.g., a Web-enabled camera. While only one network device 102 is depicted in the network 104 of FIG. 1, it will be understood that any number of network devices can be included in the network 104, the combination of which can be in communication with each other or isolated in separate communication paths. In exemplary embodiments, the network 104 includes multiple network devices, such as the network device 102, in communication with each other forming a communication fabric. The network 104 may include a combination of wired, wireless, and fiber optic communication links. The network 104 represents any deployment architecture known in the art, such as the Internet, an intranet, an extranet, a wide area network (WAN), a local area network (LAN), or any combination thereof.

The network device 102 may be any network communication device known in the art capable of receiving and processing packetized data, such as a router, a switch, a bridge, a network firewall, or a communications server. In exemplary embodiments, the network device 102 receives and sends or forwards data packets in compliance with the open systems interconnection (OSI) model, the transmission control protocol/Internet protocol (TCP/IP) model, and/or other communication protocol models supporting a real-time streaming-content protocol, such as user datagram protocol (UDP). The network device 102 may support a variety of quality of service (QoS) solutions, such as a differentiated service (e.g., DiffServ) and level-2 pack differentiation (e.g., IEEE 802.1p). The network device 102 includes at least one processing circuit (e.g., CPU 118), non-volatile memory (e.g., NVM 120), and volatile memory (e.g., RAM 122). The CPU 118 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The NVM 120 may be any non-volatile memory technology known in the art, such as ROM, PROM, EPROM, EEPROM, flash memory, NOVRAM or any other electric, magnetic, optical or combination memory device capable of storing data (i.e., a storage medium), some of which represent executable instructions for the CPU 118. The NVM 120 may also represent a secondary storage element, such as a hard disk device, that can be internal or external to the network device 102. The RAM 122 represents any volatile memory or register technology that does not retain its contents through a power/depower cycle, which can be used for holding temporary data, such as communication packets sent through the network 104. The RAM 122 may comprise multiple memory banks partitioned for different purposes, such as data cache, program instruction cache, and temporary storage for various data structures.

In exemplary embodiments, the various devices depicted in communication through the network 104, such as the computer 106, the wireless adapter 108 in communication with the wireless device 110, the network adapter 112 in communication with the phone 114, and the IP enabled phone 116, are capable of directly or indirectly sending and receiving audio and/or video streaming content. For example, the computer 106 may comprise a desktop or general-purpose computer device that transmits and/or receives streaming content through the network 104 using VoIP or video conferencing technology. Adapters such as the wireless adapter 108 and the network adapter 112 enable devices (e.g., the wireless device 110 and the phone 114) to communicate over the network 104 by translating communication signal formats between the network 104 and the associated devices. Some devices, such as the IP enabled phone 116, may have integrated network communication technology that combines the functionality of the network adapter 112 and the phone 114 into a single device. In exemplary embodiments, devices sending and receiving audio and/or video streaming content through the network 104 support one or more codecs to encode and decode the streaming content.

In exemplary embodiments, the network device 102 includes queues 124, a queue monitor 126, a packet discarding agent 128, and a discarding policy table 130. The queues 124 may include any number of priority queues that act as buffers for packets received by the network device 102 prior to passing the packets upstream and out of the network device 102. The queue monitor 126 monitors the depth of the queues 124 to determine whether a saturation condition exists, where the bandwidth required to service and maintain the queues 124 is greater than the upstream bandwidth available for the network device 102. When the queue monitor 126 determines that a saturation condition exists, the packet discarding agent 128 identifies one or more codecs employed in packets in the queues 124 and determines a packet discarding policy based on the one or more codecs. Through cross referencing to the discarding policy table 130, the packet discarding agent 128 can determine a packet discarding policy for the current conditions, and discard packets in accordance with the packet discarding policy.

In exemplary embodiment, the queues 124 reside in the RAM 122, e.g., as a data structure. The queue monitor 126 and the packet discarding agent 128 may be software applications residing in the NVM 120 and executable by the CPU 118. The queue monitor 126 and the packet discarding agent 128 may be managed and configured as separate applications or combined into a single comprehensive application. In alternate exemplary embodiments, either or both of the queue monitor 126 and the packet discarding agent 128 are implemented in hardware. In exemplary embodiments, the discarding policy table 130 is a file, table, or other data format that is read and applied by the packet discarding agent 128. The discarding policy table 130 may be stored in the NVM 120 such that its contents are retained through a power/depower cycle. In alternate exemplary embodiments, the discarding policy table 130 includes instructions executable for the CPU 118. In further alternate exemplary embodiments, the discarding policy table 130 is dynamically generated or received and stored in the RAM 122. The discarding policy table 130 may also be combined with the queue monitor 126 and/or the packet discarding agent 128. In exemplary embodiments, the network device 102 is field updateable such that a technician or network administrator can modify the queue monitor 126, the packet discarding agent 128, and/or the discarding policy table 130. The specific contents of the discarding policy table 130 can be established by a network administrator, and updated as necessary. The network administrator may also enable or disable the queue monitor 126 and/or the packet discarding agent 128.

Figure 2:
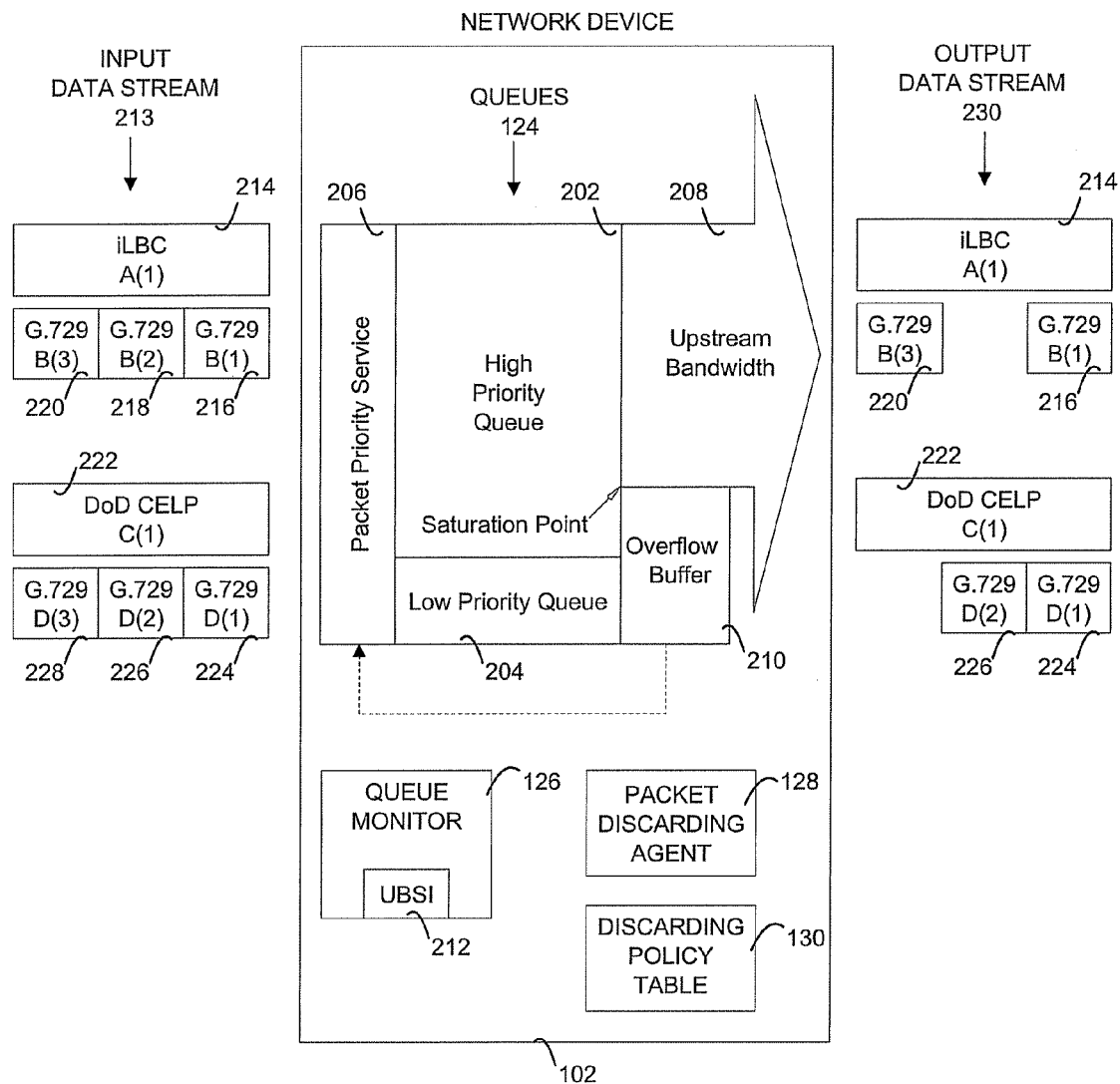
FIG. 2 depicts an exemplary packet flow through queues in a network device.

Turning now to FIG. 2, an exemplary packet flow through the queues 124 in the network device 102 is depicted. Although there are two queues depicted in FIG. 2, a high priority queue 202 and a low priority queue 204, it will be understood that any number of queues with varying priority levels may be implemented in accordance with exemplary embodiments, e.g., a high, medium, and low priority queue. In alternate exemplary embodiments, the queues 124 are implemented as a single queue with priority indicators distinguishing the priority of each packet in the single queue. In exemplary embodiments, a packet priority service 206 is utilized to assign packets to a particular queue, such as the high priority queue 202 or the low priority queue 204. The packet priority service 206 may employ a QoS algorithm in assigning packets. For example, the packet priority service 206 may assign all VoIP packets to the high priority queue 202, while assigning all FTP packets to the low priority queue 204. The depth of the high priority queue 202 and the low priority queue 204 may change independently of each other, as a varying number of high or low priority packets are assigned to each queue.

In exemplary embodiments, upstream bandwidth 208 of the network device 102 is limited to a maximum amount, depicted as the height of an arrow base in FIG. 2. The upstream bandwidth 208 refers to the total potential bandwidth that can be utilized to transmit packets out of the network device 102, e.g., a one gigabit-per-second link. When more packets exist in the queues 124 than can be supported by the upstream bandwidth 208, the remaining packets may be passed to an overflow buffer 210. The overflow buffer 210 passes overflow packets back to the packet priority service 206, where the overflow packets may be re-queued or discarded.

In exemplary embodiments, the queue monitor 126 monitors the queues 124 for a saturation condition. As more high priority packets are assigned to the high priority queue 202, the bandwidth demanded by the packets in the high priority queue 202 may exceed the upstream bandwidth 208, at which point saturation occurs. In exemplary embodiments, the queue monitor 126 sets an upstream bandwidth saturation indicator (UBSI) 212 when the bandwidth demand of the packets in the high priority queue 202 exceeds the upstream bandwidth 208 that is available. When the UBSI 212 is set, the packet discarding agent 128 may analyze the contents of the high priority queue 202 to identify codecs employed in packets in the high priority queue 202. In exemplary embodiments, the packet discarding agent 128 determines a packet discarding policy based on the codecs through cross referencing the discarding policy table 130. The packet discarding agent 128 applies the packet discarding policy to selectively discard packets in accordance with the packet discarding policy.

The following example further describes the process of selectively discarding packets in reference to both FIGS. 1 and 2. The end-user client devices of FIG. 1 may establish any number of communication connections, such as VoIP calls, through the network device 102 using various codecs. For example, input data stream 213 includes packets 214-228 that employ a variety of codecs for different connections. The packet 214 could represent an iLBC packet for a connection A between the wireless device 110 and the IP enabled phone 116, holding approximately 30 milliseconds worth of audio data. The packets 216, 218, and 220 could represent three consecutive G.729 packets for a connection B between the computer 106 and the phone 114, holding approximately 10 milliseconds worth of audio data each. The packet 222 could represent a DoD CELP packet for a connection C between the computer 106 and the IP enabled phone 116, holding approximately 30 milliseconds worth of audio data. The packets 224, 226, and 228 could represent three consecutive G.729 packets for a connection D between the wireless device 110 and the phone 114, holding approximately 10 milliseconds worth of audio data each. Each of the packets 214-228 may hold approximately the same number of bytes, but employ various codecs for each of the connections A-D. In exemplary embodiments, the packets 214-228 for the connections A-D are assigned to the high priority queue 202. Assuming that the bandwidth demand of packets in the high priority queue 202 causes the queue depth to grow beyond the upstream bandwidth 208, the queue monitor 126 sets the UBSI 212, indicating that a saturation condition is present. Instead of randomly discarding packets in the high priority queue 202, the packet discarding agent 128 determines a packet discarding policy based on the codecs through cross referencing the discarding policy table 130, and applies the packet discarding policy. Randomly discarding packets could result in discarding one or more 30-millisecond packets (e.g., packets 214 or 222) sequentially, which could cause a noticeable degradation or loss of connection. However, the saturation condition may be alleviated via selectively discarding one or more 10-millisecond packets (e.g., packets 216-220 or 224-228), which would likely have less of a detrimental effect to callers in general. The result of applying the packet discarding policy may include allowing the packets 214, 216, 220, 222, 224, and 226 to pass through the network device 102, while discarding the packets 218 and 228 as depicted in output data stream 230.

Turning now to FIG. 3, an exemplary discarding policy table 130 is depicted. The exemplary discarding policy table 130 includes columns for a codec 302, a frame size 304 (in milliseconds), a bit rate 306 (in kilobits-per-second), a discarding schedule 308, and a codec priority 310. While the exemplary discarding policy table 130 includes five columns, it will be understood that the discarding policy table 130 can be expanded or reduced both in columns and rows in accordance with the present invention. For example, the discarding policy table 130 may include only the codec 302 and frame size 304 columns. In exemplary embodiments, the discarding policy table 130 includes a list of known codecs 302 and their associated properties. The codec properties can be utilized to establish the codec priority 310 and/or the discarding schedule 308. In exemplary embodiments, the codec priority 310 is assigned relative to the frame size 304 such that codecs 302 employing a smaller frame size 304 (e.g., a lower compression codec) have a lower priority, and codecs 302 employing a larger frame size 304 (e.g., a higher compression codec) have a higher priority. Other codec properties, such as the bit rate 306, may also be utilized to establish the codec priority 310, as well as other codec properties not depicted in the discarding policy table 130 of FIG. 3. A network administrator may establish or override the contents of the discarding policy table 130, including the codec priority 310. In exemplary embodiments, the codec priority 310 is independent of the priority queue in which the packets are located. For example, the packet priority service 206 of FIG. 2 may assign all VoIP packets to the high priority queue 202 of FIG. 2, and within the high priority queue 202, further prioritization based on the codec priority 310 may be performed to select packets to discard from the high priority queue 202.

In exemplary embodiments, the packet discarding agent 128 of FIGS. 1 and 2 uses the codec priority 310 to determine a packet discarding priority. For example, when a saturation condition occurs, the packet discarding agent 128 may initially discard only packets employing low priority codec. If the saturation condition persists, the packet discarding agent 128 may then discard packets employing both low and medium priority codecs. If the saturation condition still persists, the packet discarding agent 128 may further expand the packet discarding policy to discard packets employing low, medium, and high priority codecs. While the codec priority 310 has been described in terms of low, medium, and high, it will be understood that alternate priority schemes are within the scope of the invention, e.g., a number based scheme.

At each codec priority level, packets may be discarded in a round-robin fashion. For example, if the communication connections B and D, as previously described in reference to FIG. 2, both employ codec G.729, then the packet discarding agent 128 of FIGS. 1 and 2 may discard a packet from the connection B (e.g., packet 218), then the connection D (e.g., packet 228), and then return to the connection B. The round-robin packet discarding approach may be applied at each codec priority level, e.g., sequence through all low priority codecs. Additionally or alternatively, the discarding schedule 308 in the discarding policy table 130 may be applied to determine the frequency of discarding a packet.

In exemplary embodiments, the discarding schedule 308 supports discarding either individual or multiple packets in each discarding sequence. For example, one of every three packets employing codec G.729 may be discarded, while four of every twelve packets employing G.728 may be discarded. In this example, four G.728 packets are discarded consecutively, while the next eight G.728 packets are not discarded before the sequence is repeated. It may be preferable to assign lower priority codecs to higher discarding frequencies, as the impact to streaming content may be lessened due to the smaller frame size 304 (e.g., discard 10 millisecond packets more often than 30 millisecond packets). The discarding schedule 308 may be applied either with respect to or independent of the codec priority 310. For example, when the packet discarding agent 128 of FIGS. 1 and 2 determines that only packets employing low priority codecs should be discarded, the discarding schedules 308 associated with the low priority codecs may be utilized. Alternatively, the codec priority 310 could be omitted or ignored in the discarding policy table 130 such that selectively discarding packets is performed using the discarding schedule 308 without regard to the codec priority 310.

Figure 4:
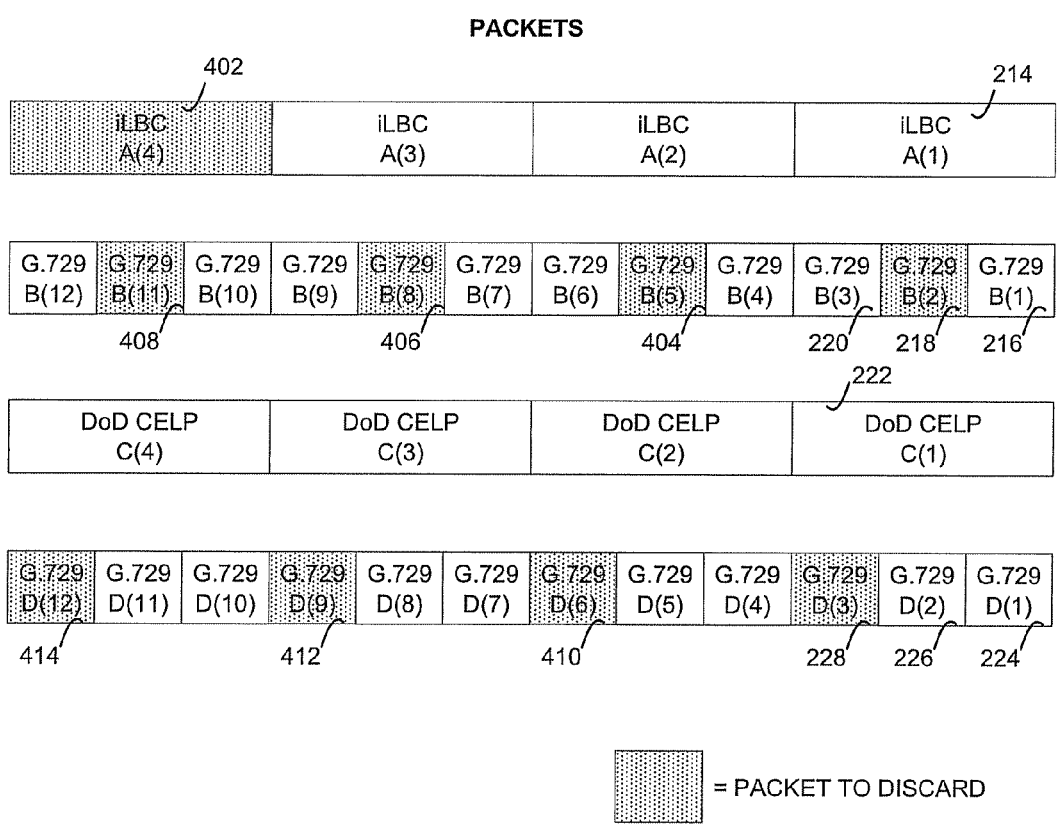
FIG. 4 depicts an exemplary sequence of packets illustrating which packets may be selected for discarding.

Turning now to FIG. 4, an exemplary sequence of packets illustrating which packets may be selected for discarding is depicted. FIG. 4 extends the sequence of packets depicted in the input data stream 213 of FIG. 2, with shaded packets highlighting the packets that may be discarded. Although the packets depicted in FIG. 4 have differing widths, it will be understood that each of the packets may contain approximately the same number of bytes, while capturing various durations of time (e.g., frame size in milliseconds) based upon the codecs employed. The exemplary sequence of packets of FIG. 4 may reside in the high priority queue 202 of FIG. 2, where packets are selected for discarding to alleviate a saturation condition. FIG. 4 also illustrates an example of applying the discarding schedule 308 of FIG. 3. For example, one of the iLBC packets 402 from the connection A is selected for discarding, while four G.729 packets 218, 404, 406, and 408 from the connection B are selected for discarding. No DoD CELP packets from the connection C are selected for discarding, but four G.729 packets 228, 410, 412, and 414 from the connection D are selected for discarding.

Figure 5:
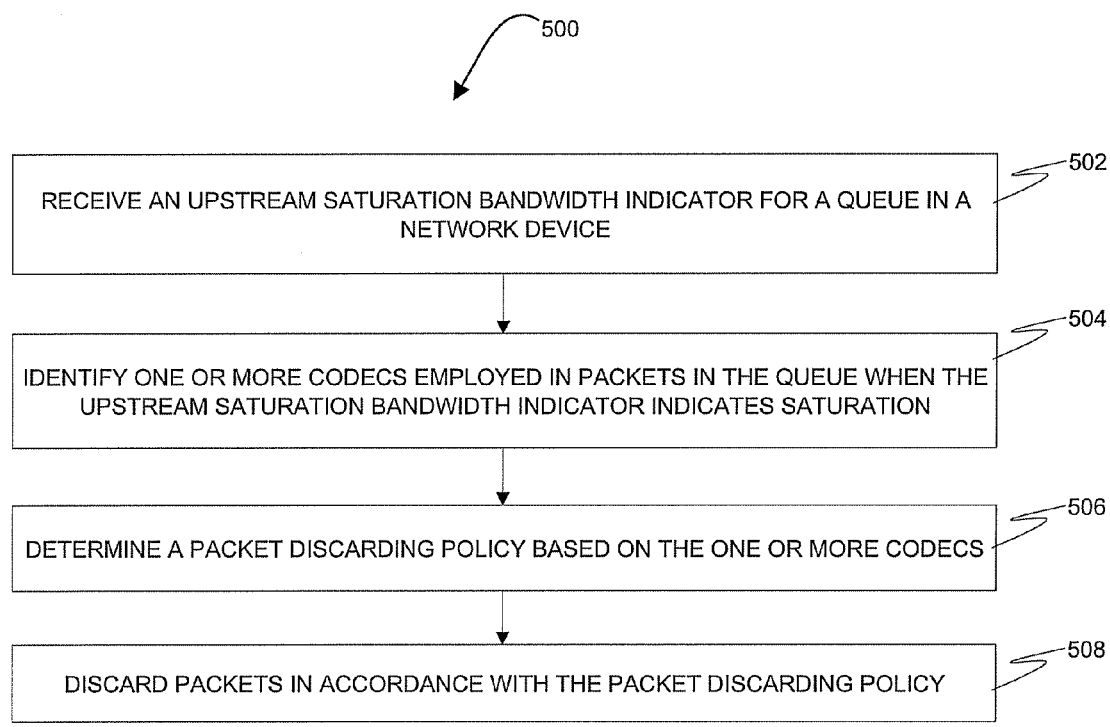
FIG. 5 depicts an exemplary process flow that may be implemented by exemplary embodiments for selectively discarding packets.

Turning now to FIG. 5, a process 500 for selectively discarding packets in a network device 102 will now be described in accordance with exemplary embodiments in reference to the system 100 of FIG. 1, and in further reference to FIGS. 2 and 3. In exemplary embodiments, the queues 124 receive packets of streaming content employing audio and/or video codecs from one or more end-user client devices, e.g., the IP enabled phone 116. The queue monitor 126 monitors the depth and contents of the queues 124, such as the high priority queue 202. Although the process 500 may be applied to any of the queues 124, for ease of explanation, the high priority queue 202 is referred to as "the queue 202" herein. In exemplary embodiments, the queue monitor 126 sets the UBSI 212 when bandwidth demand of the packets in the queue 202 exceeds the available upstream bandwidth 208. At block 502, the packet discarding agent 128 receives the UBSI 212 for the queue 202 in the network device 102.

At block 504, the packet discarding agent 128 identifies one or more codecs employed in packets in the queue 202 when the UBSI 212 indicates saturation.

At block 506, the packet discarding agent 128 determines a packet discarding policy based on the one or more codecs. The packet discarding policy may be determined through cross-referencing the one or more codecs to the codecs 302 in the discarding policy table 130 of FIG. 3, and mapping each of the one or more codecs to a codec priority 310. In exemplary embodiments, packets employing a lower priority codec are discarded at a higher frequency than the packets employing a higher priority codec. The codec priority 310 may be assigned relative to a frame size 304, a bit rate 306, or other codec properties. The codec priority 310 may also be assigned or modified by an administrator of the network device 102. Alternatively or additionally, the packet discarding policy may be further determined via mapping each of the one or more codecs to a discarding schedule 308. For example, a packet discarding policy may be, "discard packets according to the codec priority 310 and apply the discarding schedule 308". In exemplary embodiments, the discarding schedule 308 defines a frequency of selecting packets to discard.

At block 508, the packet discarding agent 128 discards packets in accordance with the packet discarding policy. The packet discarding agent 128 may discard packets in a round-robin fashion according to the codec priority 310. The non-discarded packets are output from the network device 102. In exemplary embodiments, the packet discarding agent 128 is disabled when the UBSI 212 indicates non-saturation, as determined via the queue monitor 126.

Technical effects of exemplary embodiments may include selectively discarding packets in a network device when a saturation condition is detected. By selecting specific packets to discard based on the codec employed and the properties of the codec, such as frame size, adverse effects such as heavily degraded streaming content performance or lost connections can be minimized. An advantage of exemplary embodiments may include greater aggregate call performance in a network device supporting VoIP via selectively discarding packets based on the codec employed. Further advantages may include providing an adaptable system to discard packets on a schedule and/or priority basis.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for selectively discarding packets in a network device comprising:

receiving, at the network device, an upstream bandwidth saturation indicator for a queue in the network device;

identifying codecs employed in packets in the queue when the upstream bandwidth saturation indicator indicates saturation;
determining a packet discarding policy based on the codecs; and
discarding packets in accordance with the packet discarding policy.

2. The method of claim 1 wherein the upstream bandwidth saturation indicator is set when bandwidth demand of the packets in the queue exceeds available upstream bandwidth.

3. The method of claim 1 wherein determining the packet discarding policy comprises:
mapping each of the codecs to a codec priority, wherein the packets employing a lower priority codec are discarded at a higher frequency than the packets employing a higher priority codec.

4. The method of claim 3 wherein the codec priority is assigned relative to a frame size.

5. The method of claim 3 wherein the packet discarding policy further includes:
discarding packets in a round-robin fashion according to the codec priority.

6. The method of claim 1 wherein determining the packet discarding policy comprises:
mapping each of the codecs to a discarding schedule, wherein the discarding schedule defines a frequency of selecting packets to discard.

7. The method of claim 1 wherein the codecs include at least one of an audio codec and a video codec.

8. The method of claim 1 further comprising disabling the discarding of packets when the upstream bandwidth saturation indicator indicates non-saturation.

9. A method for selectively discarding packets in a network device comprising:
receiving, at the network device, packets employing codecs in a queue in the network device;
setting an upstream bandwidth saturation indicator for the queue when bandwidth demand of the packets in the queue exceeds available upstream bandwidth;
identifying the codecs employed in the packets in the queue when the upstream bandwidth saturation indicator indicates saturation;
determining a packet discarding policy based on the codecs via cross-referencing the codecs to a codec policy table, wherein the codec policy table includes a list of codecs and an associated frame size; and
discarding packets in accordance with the packet discarding policy.

10. A system for selectively discarding packets comprising:
a network device in communication with at least one end-user client device, the network device including:
a queue which receives packets employing codecs, the packets from the at least one end-user client device; and
a packet discarding agent for:
receiving an upstream bandwidth saturation indicator for the queue;
identifying the codecs employed in the packets in the queue when the upstream bandwidth saturation indicator indicates saturation;
determining a packet discarding policy based on the codecs; and
discarding packets in accordance with the packet discarding policy.

11. The system of claim 10 further comprising a queue monitor, wherein the queue monitor sets the upstream bandwidth saturation indicator when bandwidth demand of the packets in the queue exceeds available upstream bandwidth.

12. The system of claim 10 further comprising a discarding policy table, and further wherein determining the packet discarding policy comprises:
mapping each of the codecs to a codec priority in the discarding policy table, wherein the packets employing a lower priority codec are discarded at a higher frequency than the packets employing a higher priority codec.

13. The system of claim 12 wherein the codec priority is assigned relative to a frame size.

14. The system of claim 12 wherein the packet discarding policy further includes:
discarding packets in a round-robin fashion according to the codec priority.

15. The system of claim 10 further comprising a discarding policy table, and further wherein determining the packet discarding policy comprises:
mapping each of the codecs to a discarding schedule in the discarding policy table, wherein the discarding schedule defines a frequency of selecting packets to discard.

16. The system of claim 10 wherein the codecs include at least one of an audio codec and a video codec.

17. The system of claim 10 further comprising disabling the discarding of packets when the upstream bandwidth saturation indicator indicates non-saturation.

18. A computer program product for selectively discarding packets in a network device, the computer program product comprising:
a storage medium readable by a processing circuit and storing instructions for execution by the processing circuit for implementing a method, the method comprising:
receiving, at the network device, an upstream bandwidth saturation indicator for a queue in the network device;
identifying codecs employed in packets in the queue when the upstream bandwidth saturation indicator indicates saturation;
determining a packet discarding policy based on the codecs; and
discarding packets in accordance with the packet discarding policy.

19. The computer program product of claim 18 wherein determining the packet discarding policy comprises:
mapping each of the codecs to a codec priority, wherein the packets employing a lower priority codec are discarded at a higher frequency than the packets employing a higher priority codec.

20. The computer program product of claim 19 wherein the codec priority is assigned relative to a frame size.

21. The computer program product of claim 19 wherein the packet discarding policy further includes:
discarding packets in a round-robin fashion according to the codec priority.

22. The computer program product of claim 18 wherein determining the packet discarding policy comprises:
mapping each of the codecs to a discarding schedule, wherein the discarding schedule defines a frequency of selecting packets to discard.

23. The computer program product of claim 18 further comprising disabling the discarding of packets when the upstream bandwidth saturation indicator indicates non-saturation.

* * * * *